United States Patent [19]
Kump et al.

[11] Patent Number: 5,972,535
[45] Date of Patent: Oct. 26, 1999

[54] METHOD AND APPARATUS FOR ATTACHING TERMINAL POST STRAPS TO A BATTERY PLATE GROUP

[75] Inventors: William H. Kump, West St. Paul; David L. Lund, Minneapolis, both of Minn.; Charles J. DiMarco, Kansas City, Mo.

[73] Assignee: GNB Technologies, Inc., Mendota Heights, Minn.

[21] Appl. No.: 09/170,536

[22] Filed: Oct. 13, 1998

Related U.S. Application Data

[62] Division of application No. 08/774,769, Dec. 30, 1996, Pat. No. 5,836,371.

[51] Int. Cl.$^6$ .................................................. H01M 2/28
[52] U.S. Cl. .................. 429/225; 429/161; 429/211; 429/160; 429/186; 429/130; 429/246
[58] Field of Search ...................................... 429/158, 160, 429/161, 178, 182, 186, 130, 211, 225, 226, 227, 228, 233, 246

[56] References Cited

U.S. PATENT DOCUMENTS 4,683,180  7/1987  Bish et al. .............................. 429/130

*Primary Examiner*—Maria Nuzzolillo
*Assistant Examiner*—Angela J. Martin
*Attorney, Agent, or Firm*—Leydig, Voit & Mayer, Ltd.

[57] ABSTRACT

A method and apparatus for more efficiently fusing the straps of pre-formed terminal post members with plate lugs of a battery plate group utilizing a non-reusable, inexpensive plastic mold insert. The method includes positioning the battery plate group into an open top container with the lugs of the positive plates in one row and the lugs of the negative plates in another row, positioning the plastic insert into the container with the lugs of the plate group extending upwardly through the mold insert, positioning the terminal post members on the plastic mold insert with fingers of the straps thereof disposed between plate lugs of the respective rows, supplying additional unmelted lead into remaining spaces between the plate lugs, and heating, melting, and fusing the plate lugs, strap fingers, and added lead by induction heating to form interconnections between the positive and negative plates in the respective terminals.

8 Claims, 5 Drawing Sheets

METHOD AND APPARATUS FOR ATTACHING TERMINAL POST STRAPS TO A BATTERY PLATE GROUP

This application is a divisional of co-pending application Ser. No. 08/774,769 filed Dec. 30, 1996 now U.S. Pat. No. 5,836,371.

FIELD OF THE INVENTION

The present invention relates generally to the manufacture of lead acid storage batteries, and more particularly, to a method and apparatus for attaching terminal post straps to the lugs of a battery cell plate group.

BACKGROUND OF THE INVENTION

Large industrial and motive power lead acid storage batteries typically are manufactured in small lots in a job shop type environment. Various of the manufacturing steps, including the attachment of terminal post straps onto the lugs of battery cell plate groups, are inherently slow, labor intensive, and not easily subject to change-over for different sized batteries.

A common method of attaching terminal post straps onto plate lugs has involved securing a plate group in a comb-like fixture in a burning box, locating a pre-cast terminal post and strap on the plate group, melting the plate lugs and the terminal post strap by means of a manually held gas torch, adding additional lead by melting a lead stick, and simultaneously stirring and mixing the melted lead to break down surface tension between the lead alloys and to free the mixture of entrained impurities. Not only does such manual torch burning fail to lend itself to use in automated battery production lines, the procedure cannot be carried out with consistent quality and can create a hazard to the environment of the worker.

Another method of attaching straps to plate lugs has entailed compressing and positioning the plate group in a basket-like container, inverting the plate group and positioning the lugs thereof in a mold, adding molten lead to cast straps on the lugs, removing the plate group with the cast on straps from the basket, and re-compressing and positioning the plate group into a battery container.

In sealed, valve-regulated lead acid batteries, the plate group includes separators made of relatively fragile glass mat material between the individual plates. Repeated compression and handling of the plate group can damage the separators and adversely effect battery performance and life. Even in unsealed, flooded lead acid storage batteries which do not utilize such glass mat separators, the plates are fragile and a plastic top separator piece must be used to prevent damage to the separators from insertion of a hydrometer for testing the acid during battery usage.

While proposals have been made for the automated casting of straps onto battery plate lugs, these proposals have not lent themselves to the small lot production of different size batteries. Relatively expensive, precision molds are required for the casting operation, and a different mold is required for each different plate group size to be manufactured. The lengthy change-over time also makes conventional automated cast-on-strap methods impractical in small lot battery production.

OBJECTS AND SUMMARY OF THE INVENTION

It is an object of the invention to provide an apparatus and method for attaching straps to the lugs of battery plate groups which eliminates the need for high cost molds and lengthy change-over times in the manufacture of different size batteries.

Another object is to provide an apparatus and method as characterized above which can be efficiently carried out in small lot battery production in a job shop environment.

A further object is to provide an apparatus and method of the foregoing type which minimizes damage to fragile mat separators used in the battery cell plate groups of sealed, valve-regulated lead acid batteries. A related object is to provide such an apparatus and method which eliminates the need for repeated compressing of the battery plate groups during manufacture.

Still another object is to provide an apparatus and method of the above kind which can be carried out without harm to the worker environment.

Yet another object is to provide such an apparatus and method which can be used for casting straps onto lugs of battery plate groups for use in either sealed, valve-regulated lead acid storage batteries or unsealed, flooded lead acid storage batteries, and when used in the manufacture of the latter, eliminates the necessity for a separate top separator panel for protecting the plates from damage from hydrometer insertion into the battery during usage.

Other objects and advantages of the invention will become apparent upon reading the following detailed description and upon reference to the drawings, in which:

DETAILED DESCRIPTION OF THE PREFERRED EMBODIMENT

Figure 1:
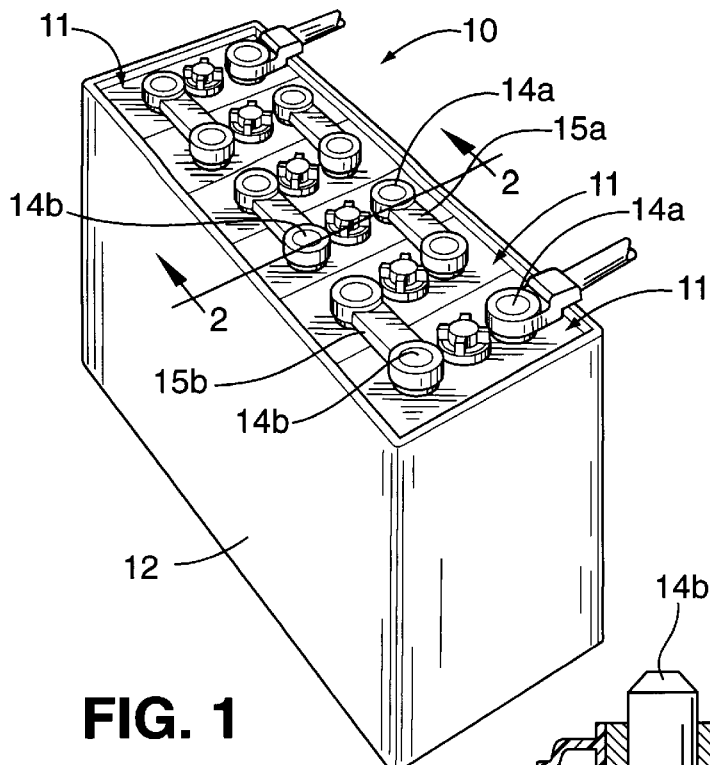
FIG. 1 is a perspective of a lead acid storage battery manufactured in accordance with the present invention.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

Referring now more particularly to the drawings, there is shown an illustrative industrial or motive power battery 10 which comprises a plurality of cells 11 that are supported in a tray 12 and have respective positive and negative terminal posts 14a, 14b coupled by connectors 15a, 15b in a conventional manner. The battery 10 in this case is a sealed, vented battery, with the battery cells 11 each comprising a container or jar 16 which houses a plate group 19 made up of a plurality of positive and negative plates 20a, 20b separated by glass mat or similar separators 21 of a conventional type. It will be understood by one skilled in the art that while the invention will be described in connection with such a sealed, vented battery, it also has utility in connection with the manufacture of unsealed, flooded lead acid storage batteries.

The battery plates 20a, 20b each have an upstanding lug 22a, 22b and during assembly of the plate group 19, the plates 20a, 20b and separators 21 are assembled with the lugs 22a of the positive plates 20a disposed in one row, and the lugs 22b of the negative plates 20b disposed in a parallel laterally spaced row. The assembled plate group 19 then is compressed and inserted into its respective open top container 16 with the lugs 22a, 22b extending upwardly. The lugs 22a, 22b preferably are disposed below the top periphery 24 of the container 16.

Figure 4:
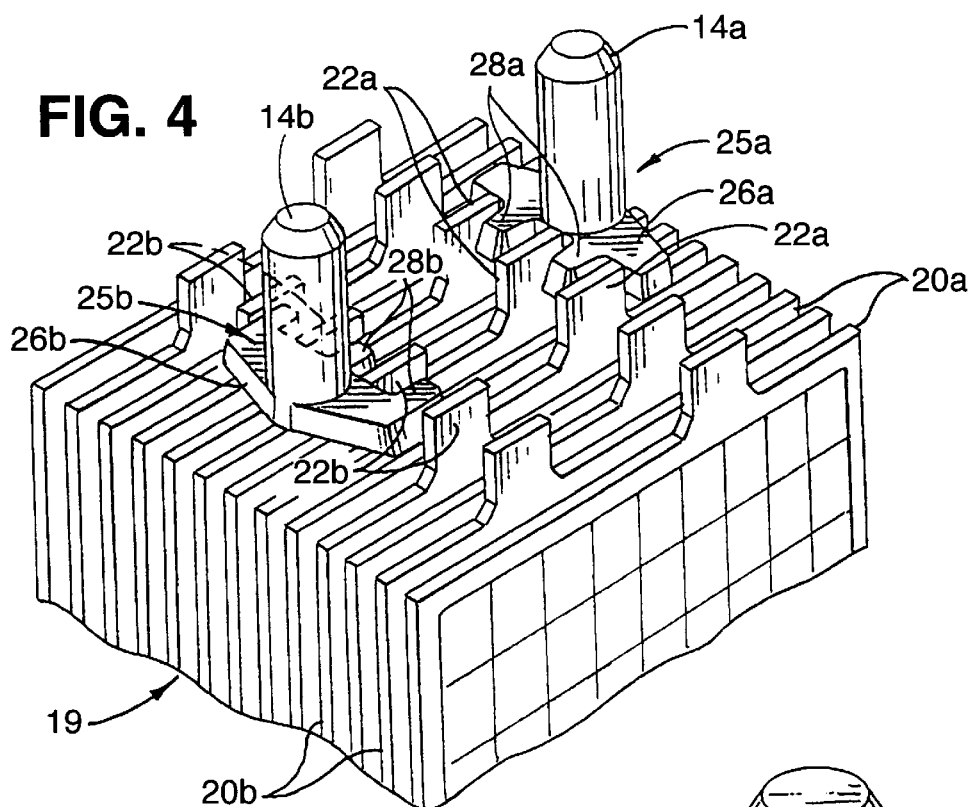
FIG. 4 is an enlarged fragmentary perspective, for purposes of illustration only, which illustrates the positioning of pre-formed terminal post members in relation to the plate lugs of a battery cell plate group, with the mold insert utilized in accordance with the invention removed.

In accordance with the invention, the lugs of the battery plate group are fused to straps of the terminal posts by an induction heating process which may be efficiently carried out with the battery plate group disposed within its respective container so as not to necessitate subsequent removal of the plate group from the container, recompression of the plate group, or handling of plate group apart from the container, thereby eliminating the chance for subsequent damage to the fragile separators of the plate group. To this end, and in carrying out the method of the invention, each terminal post 14a, 14b is part of a respective pre-formed member 25a, 25b which has a lateral strap portion 26a, 26b with a plurality of fingers 28a, 28b for positioning between lugs 22a, 22b of a respective row. (See for example, FIG. 4, where for purposes of illustration only, the terminal post members 25a, 25b are shown positioned on a plate group 19 with the mold insert to be described below removed). The terminal post members 25a, 25b, which may be formed of cast lead, preferably are designed to accommodate the smallest battery plate group to be produced and can be used as universal parts in the production of larger size plate groups. In the illustrated embodiment, the pre-cast terminal post members 25a, 25b are designed for use with plate groups having seven or more battery plates. The positive terminal post member 25a in this instance has two fingers 28a for positioning between and fusion with the lugs 22a of three positive plates 20a. The negative terminal post member 25b has three fingers 28b for positioning between and fusion with the lugs 22b of four negative battery plates 20b. Hence, the terminal post members 25a, 25b can be used with battery plate groups having as few as seven plates, and as will become apparent, with battery groups having larger number of plates.

Figure 8:
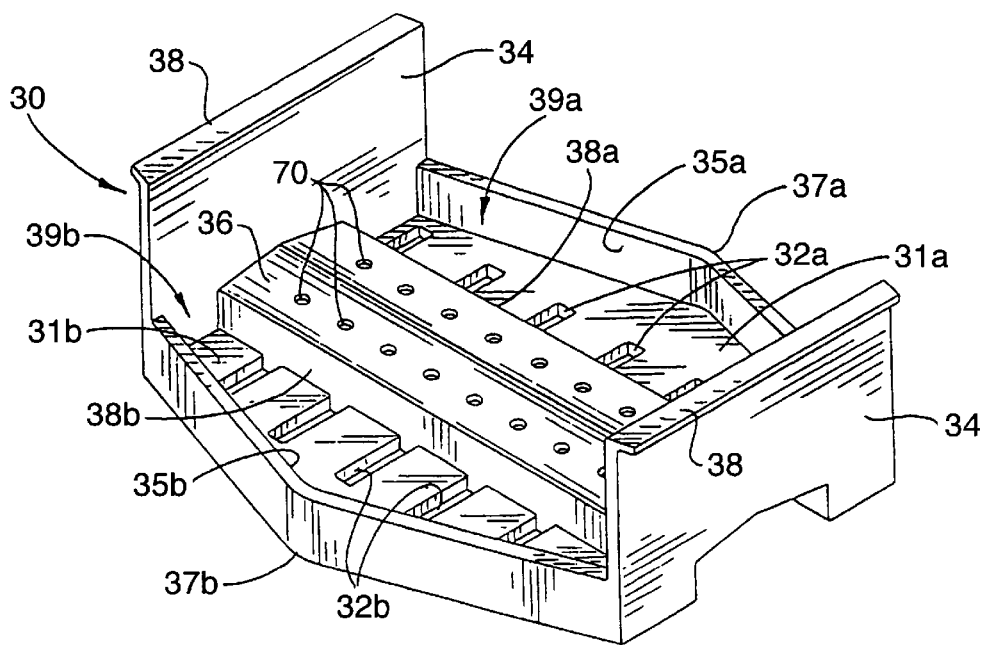
FIG. 8 is an enlarged perspective of the mold insert shown in FIG. 7.

In carrying out an important aspect of the invention, to facilitate casting and fusion of the terminal straps on the plate lugs, an inexpensive mold made of non-inductive material is utilized which becomes an integral part of the completed battery cell and which serves as a protective separator barrier in flooded lead acid battery cells to protect the separators against damage from hydrometer insertion. In the illustrated embodiment, the mold is in the form of a plastic mold insert 30, preferably made of polypropylene, which comprises a unitary body having a pair of laterally spaced bottom panels 31a, 31b each formed with a row of apertures 32a, 32b adapted for receiving a respective row of the battery plate lugs 22a, 22b, as best shown in FIG. 8. The mold 30 further has upstanding end walls 34 at opposite longitudinal ends, a pair of outer side walls 35a, 35b extending upwardly from the bottom panels 31a, 31b, and a raised, elongated central section 36 extending between the end walls 34 intermediate the bottom panels 31a, 31b. The raised central section 36 defines side walls 38a, 38b, which together with the side walls 35a, 35b, bottom panels 31a, 31b, and end walls 34 define a pair of mold cavities 39a, 39b. The side walls 35a, 35b in this instance each have a V-shaped configuration pointed outwardly relative to the sides of the mold with an apex 37a, 37b located midway therebetween.

Figure 7:
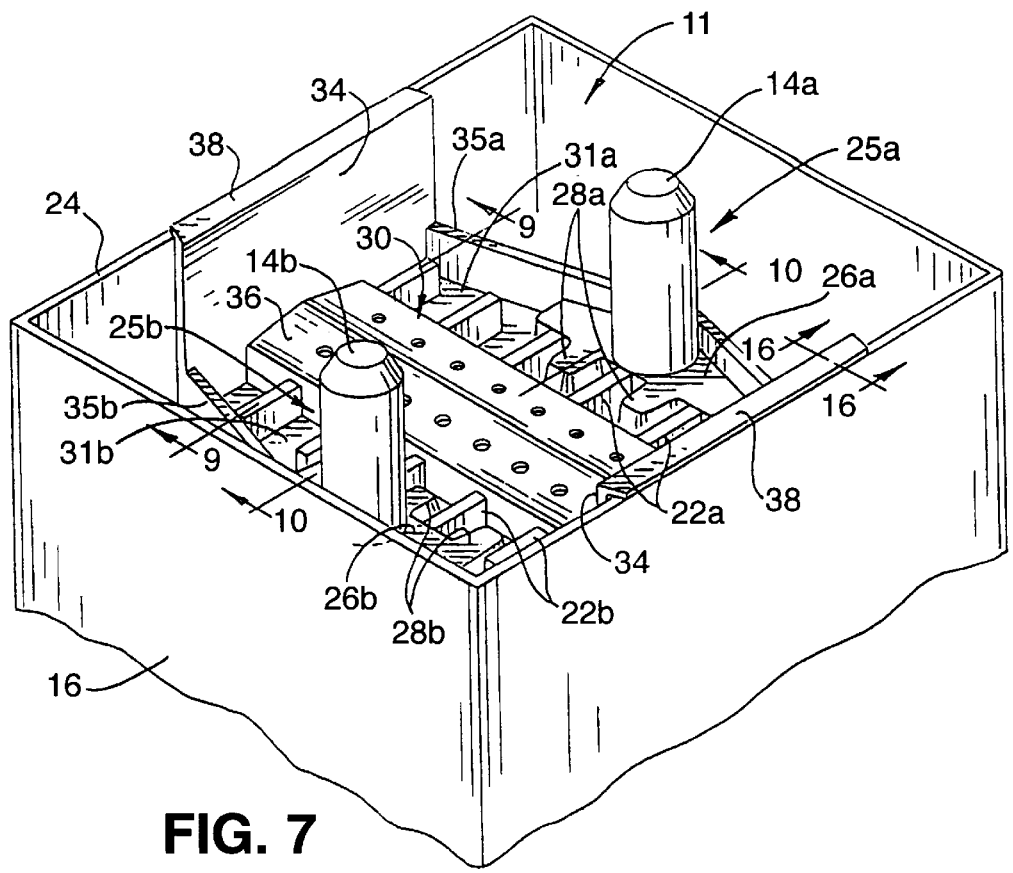
FIG. 7 is a fragmentary perspective showing a plate group, mold insert, and terminal post members assembled in a battery cell container prior to fusion of straps of the terminal post members to the plate group.

For supporting the mold insert 30 with the bottom panels 31a, 31b disposed in predetermined spaced relation to the upper peripheries of the battery plates 20a, 20b and separators 21 and with the rows of plate lugs 22a, 22b extending upwardly through the rows of apertures 32a, 32b, the end walls 34 are formed with an outwardly extending support flanges 38 that are positionable onto the upper peripheries of end walls 34 of the container 16 (FIG. 7). The mold insert 30 can thereby be easily positioned into the open end of the battery container 16 and suspended in predetermined position by the support flanges 38.

Figure 5:
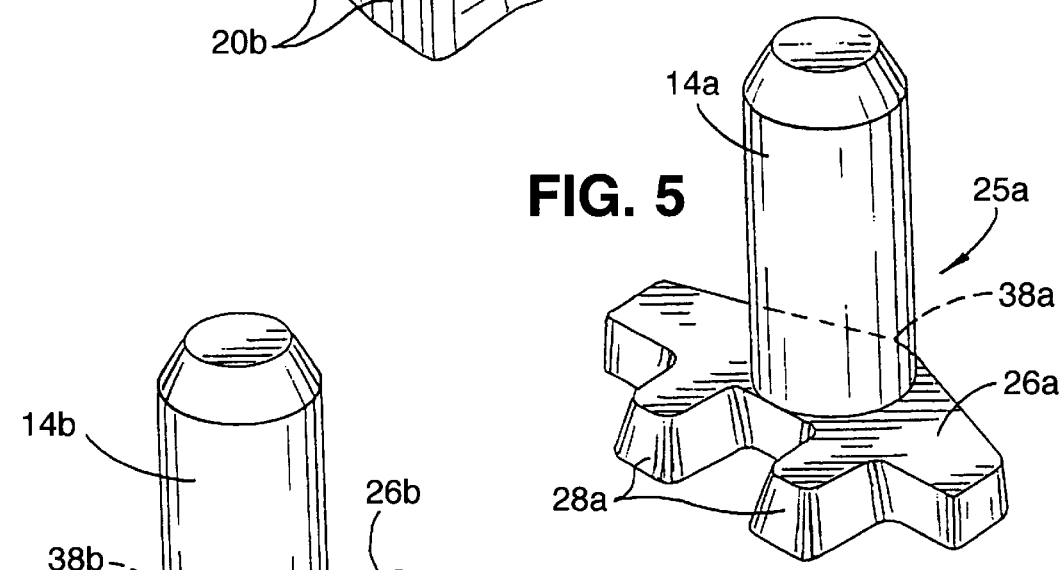
FIGS. 5 and 6 are enlarged perspectives of the terminal post members shown in FIG. 4.
Figure 6:
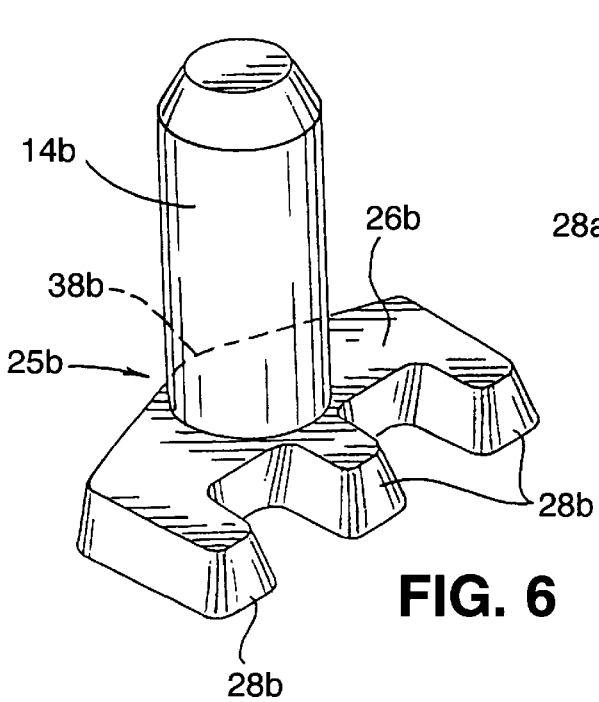

Following assembly of the mold insert 30 in the container 16 with the lugs 22a, 22b extending upwardly through the bottom panel apertures 32a, 32b of the mold insert, as shown in FIG. 7, the terminal post members 25a, 25b can be positioned on the bottom panels 31a, 31b in the respective mold cavities 39a, 39b with the fingers 28a, 28b of the straps 26a, 26b disposed between respective plate lugs 22a, 22b. To facilitate proper positioning of the terminal post members 25a, 25b, the straps 26a, 26b have V-shaped outer sides 38a, 38b (FIGS. 5–6) complementary to the V-shape of the side walls 35a, 35b of the mold insert for positioning in adjacent relation thereto. With terminal post members 25a, 25b positioned on the bottom panels 31a, 31b, the upper surfaces of the straps 26a, 26b and fingers 28a, 28b coincide substantially with the upper peripheries of the lugs 22a, 22b.

In keeping with the invention, to facilitate fusion and casting of straps onto the plate lugs, a controlled, predetermined quantity of additional lead is supplied to the mold cavities depending upon the size of the battery cell to be produced. In the illustrated embodiment, additional lead in the form of relatively small lead shot or beads 40 is supplied to the mold cavities 39a, 39b such that the lead beads 40 substantially fill the spaces between plate lugs 22a, 22b which do not receive fingers 28a, 28b of the pre-cast terminal post members 25a, 25b. In the illustrated embodiment, lead beads 40 are added to fill the spaces between all of the lugs 22a, except for the two spaces occupied by the fingers 28a of the pre-cast terminal member 25a and three spaces occupied by the fingers 28b of the pre-cast terminal member 25b. It can be seen that adjacent lugs 22a, together with the mold bottom panel 31a and side walls 35a, 38a define small chambers for receiving the lead beads 40 in the mold cavity 39a. (See FIGS. 9 and 10).

Figure 9:
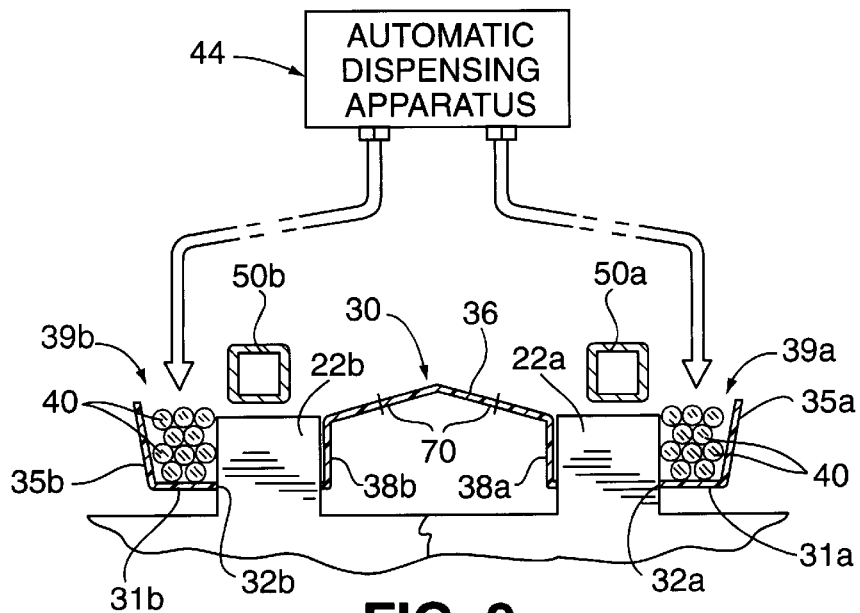
FIG. 9 is a diagrammatic depiction of the battery cell assembly shown in FIG. 7, taken in the plane of lines 9—9, following the supply of additional unmelted lead to the mold insert from an automatic dispensing apparatus.
Figure 10:
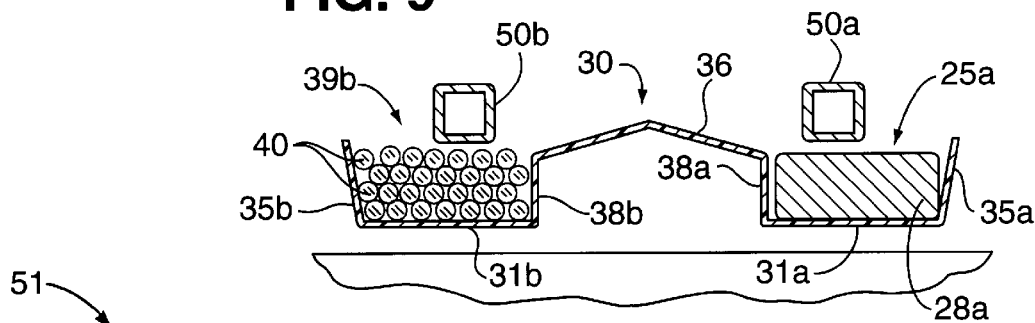
FIG. 10 is a diagrammatic depiction of the battery cell assembly shown in FIG. 7, taken in the plane of lines 10—10, following the supply of additional unmelted lead to the mold insert.

It will be understood by one skilled in the art that the predetermined quantity of added lead may be controlled by monitoring the number of lead beads, or alternatively by monitoring the weight or volume of the lead beads, depending on the size of the battery cell being produced. The lead beads 40 preferably are pre-fluxed and delivered by an appropriate mechanical or automatic dispensing apparatus 44, as depicted in FIG. 9. Hence, when producing battery cells having greater number of plates, predetermined greater quantities of lead would be dispensed. In manufacturing the smallest battery cell with the pre-cast terminal post members 25a, 25b, which in the illustrated embodiment would be a cell having seven plates 20a, 20b, the strap fingers 28a, 28b preferably would provide adequate lead to fuse the straps with the plates such that no additional lead would be required.

Figure 11:
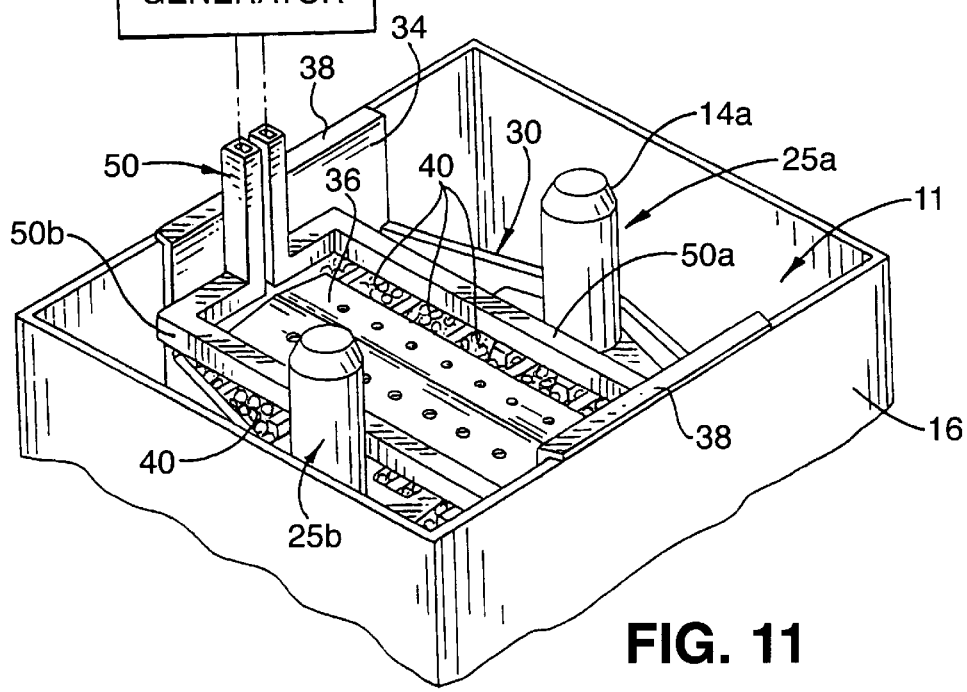
FIG. 11 is a fragmentary perspective of the battery assembly depicted in FIGS. 9 and 10 in operative relation to an induction heating apparatus.

In keeping with the invention, the plate lugs 22a, 22b, strap fingers 28a, 28b, and added lead 40, are melted and fused by induction heating, with the plastic mold insert 30 retaining and forming the fused lead straps interconnecting the respective battery plates 20a, 20b. To this end, an induction heating apparatus is provided which includes and induction coil 50 (FIG. 11). The coil 50 preferably is an endless copper tubing that is electrically coupled to an induction generator 51, which may be of a conventional high voltage type, for example, having 30 kilowatt capacity at 450 Khz, such that upon energization of the generator 51 current flow through the tubing induces high voltage heating effects of materials located in axial relation to the coil 50. For cooling the copper tubing and the generator of heat created by such high frequency current effects, cooling water may be circulated through the copper tubing as is known in the art.

In carrying out the invention, the coil 50 defines a pair of substantially straight horizontal sections 50a, 50b adapted for positioning into relatively closely spaced overlying relation to the rows of plate lugs 22a, 22b for simultaneously melting and fusing the lugs 22a, 22b, strap fingers 28a, 28b, and added lead 40. The illustrated coil 50 has a substantially rectangular configuration in which the elongated sections 50a, 50b comprise opposite sides.

In operation, when the high frequency alternating electric current from the generator 51 energizes the coil 50, it will heat, melt and fuse the top portions of the plate lugs 22a, 22b which extend through the mold insert apertures 32a, 32b, the strap fingers 28a, 28b, and the added lead 40. Such heating, melting and fusion usually taking no more than about four seconds and can be controlled so as not to heat the plastic mold insert 30 above its melting temperature. The spatial relationship between the mold insert bottom panels 31a, 31b further serves to protect the plates 20a, 20b and separators 21 from damage from the heating effects of the molten lead.

During the induction heating cycle, impurities such as lead oxide often trapped in lead battery components during casting will float up and out of the fusion zone by virtue of the vibrations caused by induction heating, thus creating a high quality fused strap connection with the plate lugs. Upon termination of the induction heating cycle, the fused and cast metal will quickly solidify, and the inexpensive plastic mold insert may be left as a permanent component of the completed battery cell.

Figure 12:
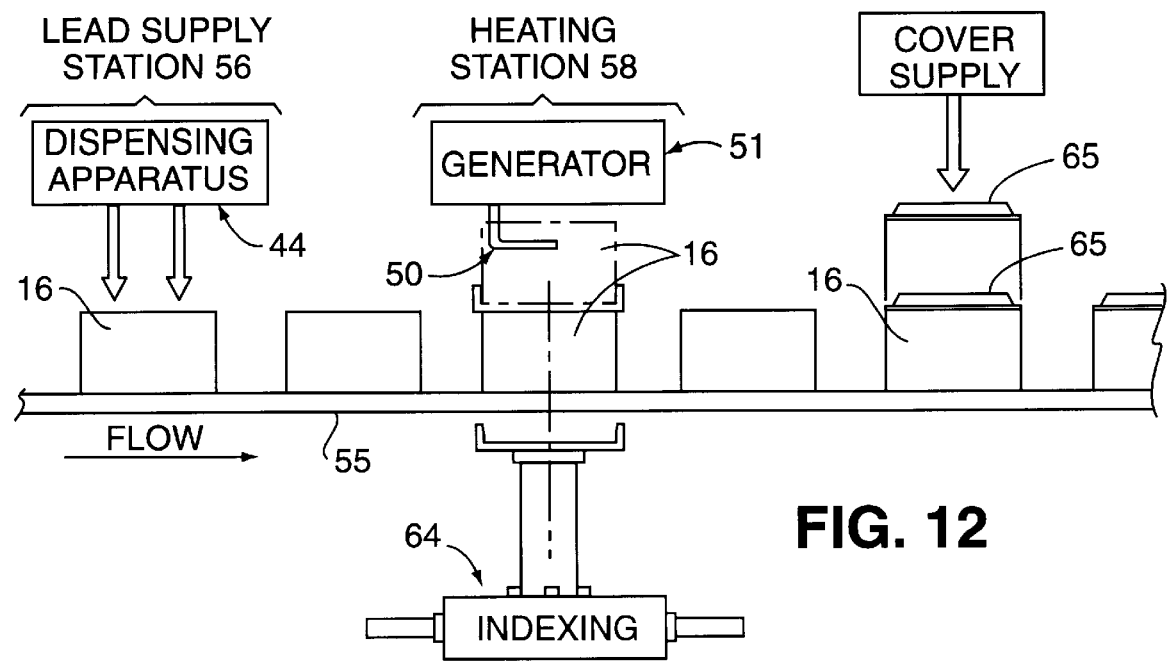
FIG. 12 is a diagrammatic depiction of an automated battery processing line in accordance with the invention.

The foregoing process may be automated for relatively high battery cell production, even in job shop environments which make small lots of various size battery cells. For example, as will be understood by one skilled in the art, the battery cell containers 16 may be automatically indexed on a conveyor 55 from a lead supply station 56 to an induction heating station 58, as depicted in FIG. 12, and sequentially elevated into closely spaced relation with the induction heating coil 50 to effect fusion and casting of the straps onto the plate lugs.

Figure 13:
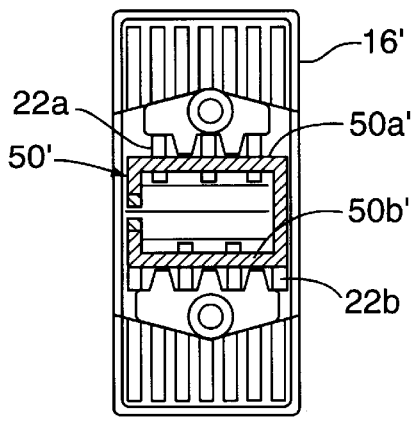
FIG. 13 is a diagrammatic depiction of the induction heating coil of the illustrated apparatus in operative relation to a relatively small size battery cell.

Pursuant to a further aspect of the invention, the induction heating coil 50 may be sized universally for induction heating and fusion of straps for various battery cell sizes. To this end, as shown in FIG. 13, an induction heating coil 50' is sized for the smallest sized battery cell to be produced, which in the illustrated embodiment as indicated above, would be a battery cell having seven plates. The coil 50' has a substantially square configuration having sides 50a', 50b' corresponding in length substantially to the length of the rows of battery plate lugs 22a, 22b for such seven plate battery cell.

Figure 14:
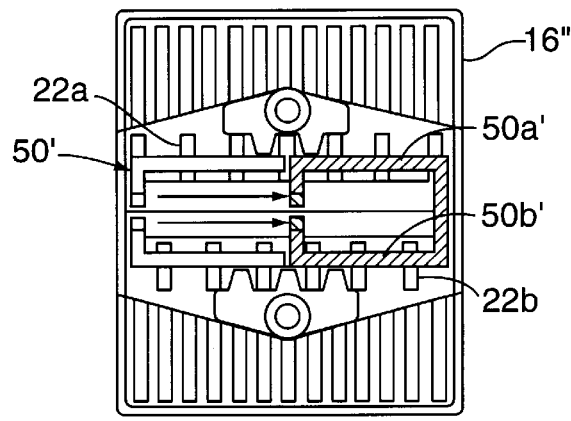
FIG. 14 is a diagrammatic depiction of one method by which the induction heating apparatus shown in FIG. 13 is used in accordance with the invention with relatively larger sized battery cells.
Figure 15:
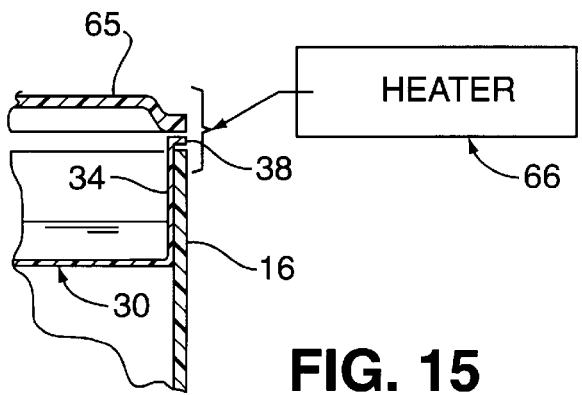
FIG. 15 is a fragmentary vertical section showing securement of a cover to a completed battery cell.

For processing battery cells having a larger number of plates, as depicted in FIG. 14, the battery cell container 16" and induction heating coil 50' may be moved horizontally relative to each other such that the coil 50' sequentially is positioned along the length of the rows of battery plate lugs 22a, 22b, or alternatively, is reciprocated to effect a scanning by the coil 50' back and forth along the rows of battery plate lugs, as depicted in FIG. 15. It will be understood that such relative horizontal movement can be effected by either transversely moving the battery cell container 16 relative to the coil 50 at the induction heating station by an appropriate indexing mechanism 64, or alternatively, moving the induction heating coil relative to the battery plate lugs. In either case, induction heating may be controlled to effect substantially uniform depth melting, casting, and fusion of the lugs, straps, and added lead.

Following fusion of the straps and the plate lugs, the battery cell may be processed to a further station where a cover 65 is placed on the container. In addition to enclosing the top of the battery, the cover serves to positively retain the mold insert support flanges 34 in place. In the case of a sealed vented battery in which the cover 65 is sealed to the container 16, the cover 65, mold insert support flanges 34 and container 16 may be fused together, such as during a subsequent heating step 66 as shown schematically in FIG. 15.

Figure 2:
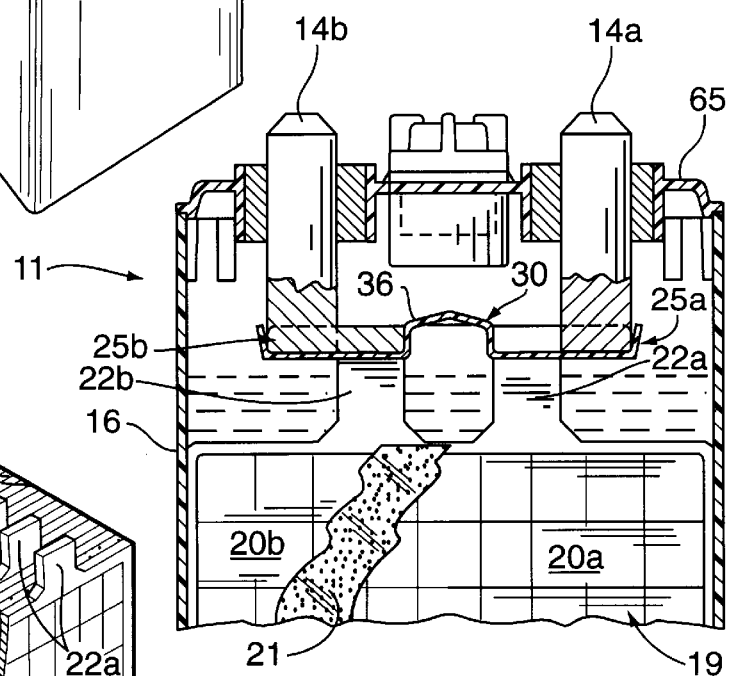
FIG. 2 is an enlarged fragmentary section of one of the battery cells of the lead acid storage battery shown in FIG. 1.
Figure 3:
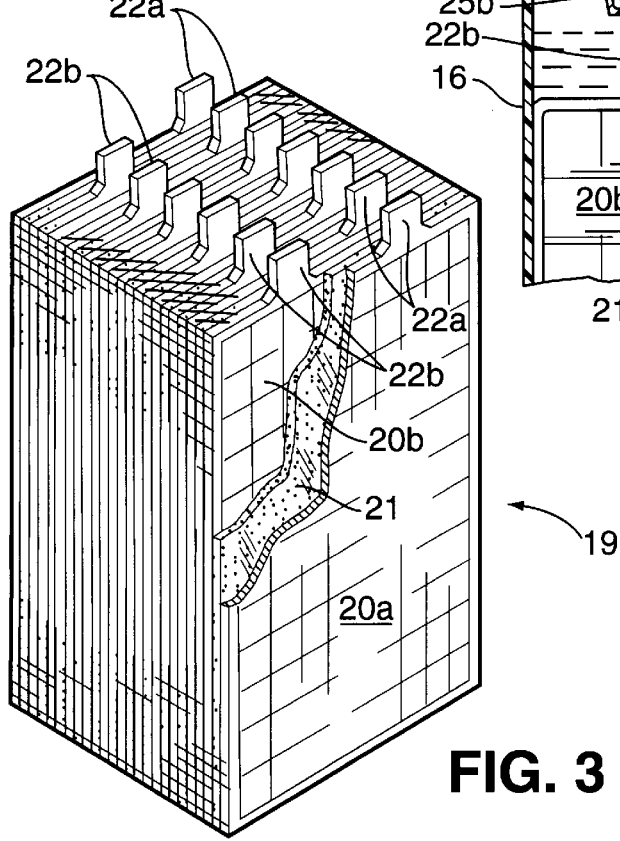
FIG. 3 is a perspective of a plate group of one of the illustrated battery cells.

In the case of unsealed, flooded lead acid batteries, it will be seen that the plastic mold insert, which remains an integral component of the completed battery cell, will provide a protective barrier for the battery plates against damage from insertion of a hydrometer into the battery cell during usage, thereby eliminating the necessity for a conventional separator plate. To permit circulation of lead acid in such flooded batteries about the battery plates and above the mold panels 31a, 31b for access to hydrometer testing, the raised mold section 36 is formed with a plurality of apertures 70 to permit acid circulation. (See FIGS. 2 and 7).

From the foregoing, it can be seen that the present invention enables the efficient fusion and casting of terminal straps onto battery lugs of battery cell plate groups in even small lot battery production. The apparatus and method eliminate the need for high cost molds and lengthy change over times typically required in the automated manufacture of different sized batteries. The invention further minimizes damage to fragile mat separators used in plate groups of sealed, valve-regulated lead acid storage batteries by eliminating the need for repeated compressing of the battery plate groups during the manufacturing process. In flooded, lead acid batteries, the inexpensive plastic mold, which remains an integral component of the battery cell, serves to protect the battery plates from damage due to hydrometer insertion during usage.

What is claimed is:

1. A lead acid storage battery comprising a container, a battery cell disposed within said container, said battery cell including a plurality of positive and negative plates each having a respective upstanding lug, the lugs of said positive plates being disposed in one row and the lugs of said negative plates being disposed in a second row, one piece insert made of non-metallic material, said insert being formed with first and second rows of apertures and being positioned over the battery cell in said container with the lugs of said first and second rows each extending upwardly through a respective one of said apertures in said insert, and a pair of terminal posts each having a strap portion fused to a respective one of the rows of plate lugs at a location above said insert.

2. The battery of claim 1 in which said insert is made of plastic.

3. The battery of claim 1 in which said insert is positioned in spaced relation above said plates.

4. The battery of claim 1 in which said insert has two bottom panels each formed with a respective one of said rows of apertures.

5. The battery of claim 4 in which said insert includes a pair of upstanding end walls at opposite longitudinal ends of said bottom panels, a pair of outer side walls extending upwardly from said bottom panels, and a raised elongated central section extending between said end walls intermediate said bottom panels, said end walls, side walls, and raised central section defining a pair of cavities each containing a respective one of said terminal straps.

6. The battery of claim 5 in which said insert side walls each have a V-shaped configuration, and said terminal post straps have V-shaped side walls shaped complementary to and positioned adjacent the V-shaped insert side walls.

7. The battery of claim 5 in which said insert end walls each have an outwardly extending support flange positionable on an upper end of said container for supporting said plastic insert within said container.

8. The battery of claim 5 in which said insert raised section is formed with a plurality of apertures.

\* \* \* \* \*